Oct. 17, 1967   A. F. STANCELL ETAL   3,347,695
METHOD OF SURFACE ACTIVATION OF NON-POLAR
HYDROCARBON RESIN AND PRINTING
Filed March 27, 1964

ACTIVATING SURFACE OF A PREFORMED
POLYOLEFIN ARTICLE BY CONTACT WITH
HOT OXIDIZED SURFACE OF A METAL BODY

PRINTING ACTIVATED SURFACE OF
POLYOLEFIN ARTICLE WITH POLAR
INK

Inventors
Arnold F. Stancell
George Brecht
Andrew J. Foglia
By James F. Snowden
Attorney United States Patent Office 3,347,695
Patented Oct. 17, 1967

3,347,695
METHOD OF SURFACE ACTIVATION OF NON-POLAR HYDROCARBON RESIN AND PRINTING
Arnold F. Stancell, New Brunswick, and George Brecht, Metuchen, N.J., and Andrew J. Foglia, Brooklyn, N.Y., assignors to Mobil Oil Corporation, a corporation of New York
Filed Mar. 27, 1964, Ser. No. 355,458
18 Claims. (Cl. 117—38)

The present invention relates to activating or conditioning the surface of shaped thermoplastic resin articles, especially those made from hydrocarbon resins, and also to printing the activated surfaces of such articles.

Various methods have been proposed for activating or conditioning the surfaces of polyethylene film in order to improve the adhesion of printing inks thereto. Subjecting the film to a corona discharge of high voltage alternating current in relatively elaborate equipment has been employed extensively. Also, flame treatments and exposure of the plastic film to heated gases have been suggested; but these have left much to be desired in respect to the evenness or uniformity of the surface activation. Accordingly, there is a need for a simple treatment which is not difficult to control and which provides a uniform conditioning of the film surface without requiring expensive equipment.

In a broad sense, the present invention is a surface conditioning process in which a surface of a shaped thermoplastic resin article is heated in intimate contact with an oxidized surface of a metal maintained at a temperature of at least 330° F. for a period sufficient to activate said article surface for bonding and thereafter said article is removed from contact with said oxidized metal surface, whereby the bonding characteristics of said article surface are improved. The invention also includes a combination of these steps with the step of printing the heat-treated surface with inks having substantial polar characteristics.

This novel treatment which is especially suitable for the activation of surfaces of nonpolar hydrocarbon resins, substantially improves the wettability of the treated surface with polar liquids while substantially maintaining the form and thickness of the article; and the article is desirably removed from contact with the oxidized metal while the temperatures throughout at least half the thickness of the article are below the crystalline melting point of the resin.

Narrower aspects of the invention relate to one or more of such features as keeping the oxidized metal surface at a substantially constant temperature below about 800° F., and preferably between about 400 and 600° F.; treatment of the important polyolefin resins—especially polyethylene and polypropylene; certain preferred forms of the articles, such as films; employing certain preferred metal oxide coatings, particularly those comprising oxides of aluminum or chromium derived from substantially pure solid metals, platings or in alloys; and also a continuous process with a rotating cylindrical oxide surface heat treating a continuous moving web of the resin.

The figure of the accompanying drawing schematically illustrates one embodiment of the present invention wherein the surface of a preformed article made of a polyolefin resin is subjected to the aforesaid activation and the activated resin surface is thereafter printed with a polar ink.

The instant treatment increases the surface energy of resins and it is particularly suitable for improving the adhesion of inks, dyes or adhesives having polar characteristics, that is materials containing a substantial proportion of at least one polar component, to the surfaces of hydrocarbon resins of nonpolar character. Such improvement includes better wetting of the treated surface by the ink, dye or adhesive, as well as the stronger adhesion therebetween as demonstrated by the resistance of the ink after drying to being lifted off by a tacky substance and also by greater resistance to cracking, flaking or peeling, even when subjected to extreme flexing or folding. These qualities may be quantitatively determined by measuring the contact angles between a drop of the polar substance to be utilized and the surface of the resin in question. However, it is not necessary to determine the extent of activation or degree of surface energy of the treated plastic surface by this method for a simple, reliable and practical tape test is set forth in the examples hereinafter.

Thermoplastic resins in general of low surface energy, for example, the nonpolar hydrocarbon resins including homopolymers and copolymers of olefins and related materials, such as styrene, as well as mixtures thereof may be treated by the new process. The treatment is suitable not only for unmodified resins but also commercial resin compositions containing various additives, as for example, dyes, pigments, flame retardants, antioxidants, stabilizers against discoloration resulting from ultra-violet light, etc.

Polyolefins, including the polybutylenes, such as polybutene-1, are the preferred raw materials and it presently appears that the greatest utility of the invention may lie in conditioning polypropylene and especially polyethylene for both are produced in large quantities. None of the nonpolar hydrocarbon resins prints acceptably with the polar inks commonly employed on plastic materials as the bonding of the ink is not satisfactory. The present process is suitable for the activation of many types of articles formed from these resins by extrusion, molding, calendering, casting, laminating, etc. It is particularly adaptable to conditioning flat surfaces, especially those of substantial area as exemplified by flexible sheets or continuous webs of the plastic material, and most importantly to films which are currently manufactured in extremely large volume.

This invention is not limited to the treatment of resins alone for it may be also utilized in conditioning composite materials, such as the exterior surfaces of resins employed as coatings or laminations on various substrates of paper, pulp board, textile fabrics and fibers, other synthetic resins, asbestos, wood, metals, etc. of flat or contoured configuration. There does not appear to be any limitation as to the thickness of the article undergoing treatment.

The oxidized metal surface in contact with the resin surface to be activated may be maintained at temperatures between about 330 and 800° F. and the preferred range is between about 400 and 600°. Temperatures below about 330° usually require excessively long treatments while temperatures above about 800° are not only difficult to control but also likely to melt or deform a thin article or to cause excessive sticking of the plastic to the oxide surface. For most purposes, it is preferred to use the lowest temperature for any selected resin that will activate its surface within a reasonable time. This heating operation is of the conductive type and also a surface catalytic action is thought to be involved in the surface activation of the resin; therefore intimate contact of the film surface and the metal oxide surface is essential for both of these reasons. With such contact, it is easy to have close control of the treatment and obtain a product having an uniformly activated surface in sharp contrast to the product variations encountered with certain heat treatments of the prior art.

No particular pressure is required in the instant process so long as intimate surface contact is maintained during the heat treatment. The relatively high pressures used in certain examples hereinafter are employed from an excess of caution to insure attaining the necessary intimate surface contact. In the conditioning of a flexible plastic web in the continuous commercial operation, it is contemplated that tensioning rolls or other known tensioning devices may be used to maintain firm and intimate contact between one surface of web and the heated oxidized surface of a rotating metal drum or roll.

There is a time-temperature relationship in the instant process and similar surface activation of a selected plastic may be produced in a fraction of a second at temperatures in the upper part of the aforesaid ranges and in periods ranging up towards one hour at the lower temperatures therein. In addition, the time of treatment may be expected to vary with a composition of the resin subjected to the treatment, the molecular weight of the resin, the particular metal oxide employed or mixture of metal oxides (e.g., in the case of an alloy), the physical characteristics of the metal oxide surface and the desired degree of surface activation.

The time of treatment should be sufficient to substantially improve the wettability of the resin surface with polar liquids, and it is desirably limited by removing the resin surface from contact with the oxidized metal surfaces while temperatures throughout at least half the thickness of the article are still below the crystalline melting point of the resin. The most practical manner of determining a suitable treating time for any selected temperature is by applying the ink-and-tape test described in the examples which follow. To attain maximum producion and minimize decomposition of the resin, it is usually desirable to employ the shortest contact time that will provide a suitable degree of surface activation for the necessary bonding of inks, dyes or adhesives.

Present indications are that the activation is of a substantially permanent nature; hence, the printing or dyeing of the resin surface or application of an adhesive thereto may usually be carried out at any time after the heat treatment of the surface.

In general, the surface activation may be performed by intimately contacting the resin surface with a heated metal oxide or mixture of oxides in solid form. For most purposes, the oxidized surfaces of metals or alloys are preferred for convenience and for superior heat transfer characteristics. Also a highly adherent coating or layer of the oxide on the base metal is usually desirable. While copper having an oxide coating thereon produced by heating in air has been found operative for the purpose, it is not recommended for general usage inasmuch as the oxide coating has a tendency to flake off under some conditions. Suitable materials include, inter alia, the oxides of aluminum, chromium, vanadium and similar metals as well as their alloys. These form tightly adherent oxide coatings, some of an inconspicuous transparent nature, upon exposure to normal atmospheric conditions or upon heating or by using known chemical treatments. The preferred metal oxides are those formed on the surface of stainless steel alloys in general (especially of the 18% chromium and 8% nickel series), aluminum and its alloys and chromium plated base materials, such as steel. Unless otherwise stated, the term "metal" is employed herein to include alloys and platings as well as substantially pure metals.

The metal oxide surface should, of course, have a configuration matching that of the resin article. In the case of flexible plastic webs undergoing treatment in a continuous manner, a cylinder or roll is the most convenient form for the oxide surface. The time of treatment can be controlled by regulating any one of several factors including roll speed, roll diameter and the degree of wraparound, that is the arc of the roll in contact with the plastic web. Also, a plurality of heated rolls may be employed in sequence to provide the necessary time of contact. In some cases, it may be desirable to cool the reverse side of the plastic film in order to minimize the temperature rise within the body of the film. This may be accomplished by blowing a blast of cool air against the reverse side of the film while it is in contact with the hot oxidized surface or by passing the film through the nip of a pair of coacting rolls comprising a heated roll of the type described and a cold roll.

The hot rolls may be heated in conventional manner by circulating high boiling liquid heating mediums therethrough or, within limits, by use of high pressure steam or by thermostatically controlled electrical heating elements embedded therein. Any cold roll employed may be cooled with water or other fluid cooling medium if so desired.

In instances where any difficulty may be experienced with the plastic film or web sticking to a hot oxidized roll, the roll temperature is desirably reduced to the minimum which will give the necessary degree of surface activation of the resin. Also, it is contemplated that in some cases, various release agents may be employed to alleviate this problem, especially those agents which are absorbed within the resin article or within the metal oxide surface and also those which may be dispersed or scattered as discrete particles or droplets across the contact surfaces so that the parting agent does not seal off any substantial continuous area of the surface undergoing heat treatment from intimate contact with the oxidized surface.

For a better understanding of the nature and objects of this invention, reference should be had to the following illustrative and comparative examples in which all polyolefin specimens are commercially produced films containing a conventional antioxidant.

EXAMPLE 1

A six-inch square of 0.018 inch thick polyethylene film is placed between two sheets of aluminum foil (Reynolds Wrap®). The foil has the usual tightly adherent, thin, transparent surface layer of the metal oxide that is formed on metallic aluminum surfaces upon exposure to the atmosphere. The assembly is placed between the platens of a hydraulic press with the unheated lower platen at a temperature of 100° F. and the upper platen heated to 600° F. The press is then closed, and the pressure rapidly elevated to 555 pounds per square inch (p.s.i.) of film area to insure intimate contact of foil and film while heat-treating the upper face of the film. After holding this pressure for three seconds, the pressure is released, the press is opened and the foil and film assembly is transferred to another press for cooling for a few seconds at moderate pressure between water-cooled platens—all in rapid sequence.

The polyethylene film is removed from the aluminum foil and a polar ink, Polyethylene Testing Red Ink No. 67126 (Interchemical Corporation), is applied to the heat-treated polyethylene surface with a hand printing roller. A control sample of untreated polyethylene film from the same source is inked similarly. Both printed specimens are dried for 15 minutes at 70° F. Next, the samples are placed on a smooth hard base and a strip of ¾ inch wide pressure-sensitive cellophane tape (Minnesota Mining and Manufacturing Company) is applied across the face of each specimen by rolling the tape onto the printed surface with a six-inch diameter steel roller which is 15/16 inch wide and weighs approximately eight pounds. Upon peeling off both strips of tape at a 180° angle, it is found that the cellophane tape removes all of the ink on the control sample in contact with the tacky surface of the cellophane tape for an ink adhesion rating or index of 0% by this arbitrary test; whereas the heat-treated specimen displays 100% ink adhesion since no ink is removed in stripping the tape from the heat-treated surface.

EXAMPLE 2

A piece of the same 18 mil polyethylene film is placed between two pieces of the same aluminum foil and for a period of two seconds is pressed at 60 p.s.i. between an unheated, fixed, upper plate and a pneumatically operated lower plate heated to 600° F.; then the pressure is quickly released and the sample removed for cooling at room temperature. Upon testing the heat-treated surface of the polyethylene film (i.e., the lower face during the heating), the ink adhesion index is discovered to be about 100% by the tape test described in Example 1.

EXAMPLE 3

The procedure of Example 2 is repeated using a 12-mil thick film of polypropylene instead of polyethylene with all other conditions remaining the same. Using the tacky tape test, ink adhesion on the heat-treated surface of the polypropylene film is found to be of the same order as the activated film of Example 2.

EXAMPLE 4

A mold assembly is set up using a pair of 0.5" x 8" x 8" chromium plated steel plates, one flat and one recessed, which have the usual thin, transparent, adherent surface layer of oxidized chromium. The bottom plate has a 6" x 6" recess of 0.030" depth facing upward and a slightly smaller square of 0.015 inch thick brass shim stock is placed at the bottom of the recess. Next, a 6-inch square of 0.018" thick polyethylene film bearing a thin film of white heavy paraffin oil (medicinal grade) on each face as a release agent is laid on top of the brass with the upper part of the polyethylene extending a few thousandths of an inch above the surface of the bottom chromium plated mold plate to insure intimate contact of the polyethylene film with the upper flat chromium steel plate. The platens of a hydraulic press are preheated to the operating temperature of 330° F., and the aforesaid assembly is introduced at room temperature and pressed at 468 p.s.i. for 30 minutes. Then the mold assembly is released and rapidly removed to another press where it is cooled between water-cooled platens at the same pressure. Afterward the polyethylene film is removed and the surface in contact with the upper press plate is subjected to the usual ink and tape test and found to have an ink adhesion rating of 0%.

The identical procedure is repeated except that the time in the hot press is extended to one hour. Upon examining the treated polyethylene film, no oil is observed on the surface thereof. The polyethylene film is cut into two specimens and upon applying the ink-and-tape test to one of these samples without substantial delay, it is found that the ink adhesion rating of the surface in contact with the upper chromium plated surface is 100%.

After standing overnight, it is noted that the second specimen of the one hour heat treatment feels somewhat oily or greasy when handled. The ink adhesion is found to be nil on this half of the treated film upon applying the tape test to the same surface, namely the one in contact with the upper chromium plate.

Upon re-examining the first of the specimens subjected to the one hour heat treatment, it is found that this sample also developed an oily feeling after standing overnight. However, a 100% ink adhesion rating is obtained in re-applying the tape test to another portion of the previously printed area and this rating is maintained in subsequent retesting with tape over an extended period.

In view of the apparent disappearance of the oil film or coating during the heat treatment and its subsequent reappearance after aging, it may be postulated that the mineral oil is absorbed by the polyethylene during the heat treatment and subsequently sweats out upon aging for more than about 12 hours. While so absorbed, the oil apparently does not interfere with adequate contact between the surfaces of the mold plate and the polyolefin film for activating the latter or with the adhesion of a polar ink to the activated film surface.

*Comparative Example A*

Example 2 is repeated using the same film but with the aluminum foil replaced by thoroughly cleaned brass plates free of any oxide coating. The ink adhesion is found to be 0% upon tape testing the film surface heat-treated in contact with a brass plate.

*Comparative Example B*

The procedure of Example 4 is repeated with a 5 mil thick piece of polyethylene terephthalate film disposed between the polyethylene and the top mold plate (chromium plated). The platens are maintained at a temperature of 330° F. and the pressing time is extended to 90 minutes to compensate for the low heat transfer coefficient of the polyester film and to insure that the heat treatment at the interface of the polyethylene and the polyester films is at least equal in severity to the one hour heat treatment of Example 4.

An ink adhesion rating of zero is obtained upon testing the polyethylene film surface in contact with the polyester film during heating.

*Comparative Example C*

Another specimen of the polyethylene film is heated in a circulating air oven maintained at a temperature of 330° F. for a period of 90 minutes while supported on a sheet of asbestos-cement board with the supper surface of the film uncovered and therefore freely exposed to the air inside the oven. After taking the board out of the oven, the plastic article thereon is allowed to cool to room temperature. Upon removing the cool plastic film and subjecting it to the ink-and-tape test described earlier, it is found that its ink adhesion index is nil. Thus, it is apparent that heating a commercial polyethylene film containing an antioxidant in air for an extended period will not activate the surface of this plastic insofar as the adhesion of an ink with polar characteristics is concerned.

The failures to activate the surfaces of the polyethylene films in the last three comparative examples are attributed to the absence of a metal oxide surface in contact with the film during the heat treatment. As for comparative Example A, metal rather than a metal oxide is in contact with the polyethylene film surface being heat-treated. The polyester film of comparative Example B prevents contact between the oxidized surface of the chromium plated upper mold plate and the upper surface of the polyethylene film, so again intimate contact with a metal oxide is absent. In comparative Example C, the same inhibited polyethylene film is heated with free access of air thereto for a sufficient time at the elevated temperature employed to activate the film when in contact with an oxidized metal. Such activation is believed to result from a partial oxidation of the polyethylene surface, and failure to achieve it in the oven may be due to the inhibiting effect of the small amount of antioxidant in the commercial grade of polyethylene. Since comparable heating of the polyethylene in air as well as in contact with unoxidized metals and other plastic films fails to activate the surface of polyethylene, it appears that contact with a hot metal oxide is necessary in procuring the desired bonding characteristics on a hydrocarbon resin surface. It may be postulated that the instant process is an oxidation of the resin surface to form polar groups thereon, such as carbonyl groups, and that such oxidation is catalyzed by contact with an oxidized metal surface. In any event, the surface energy of the resin is increased by the technique of this invention.

While the present process has been described in full detail especially in the illustrative examples set forth herein, nevertheless, it will be appreciated by one skilled in the art that many variations and modifications of the invention may be made without departing from the spirit and scope of the invention, especially with respect to suitable oxidized metals and alloys for contact with the resin surfaces. Accordingly, the instant process should not be construed as limited in any manner except as may be recited in the appended claims or required by the prior art.

We claim:

1. A surface conditioning process which comprises heating a surface of a preshaped nonpolar hydrocarbon resin article in intimate contact with an oxidized metal surface adherent to a body of a metal of the group consisting of chromium, aluminum, vanadium and copper and maintained at a temperature between about 330 and 800° F. for a period sufficient to substantially improve the wettability of said article surface with polar liquids and removing said article from contact with said oxidized metal surface while the temperatures throughout at least half of the thickness of said article are below the crystalline melting point of said resin to substantially maintain the form and thickness of said article, whereby the bonding characteristics of said article surface with materials having polar characteristics are substantially improved.

2. A process according to claim 1 in which said oxidized metal surface is maintained at a temperature between about 400 and 600° F.

3. A process according to claim 1 in which said resin is a polyolefin.

4. A process according to claim 1 in which said resin is polyethylene.

5. A process according to claim 1 in which said resin is polypropylene.

6. A process according to claim 1 in which said oxidized surface comprises aluminum oxide.

7. A process according to claim 1 in which said oxidized surface comprises an oxide of chromium.

8. A process according to claim 1 in which said article is in sheet form.

9. A process according to claim 1 in which a moving web of said resin is heated in contact with a moving oxidized metal surface.

10. A process according to claim 1 in which a continuous moving web of thermoplastic film is heated in contact with a rotating cylindrical oxidized metal surface.

11. A process for activating the surface of a polyolefin sheet which comprises heating a surface of preformed polyolefin sheet in intimate contact with an oxidized metal surface adherent to a body of a metal of the group consisting of chromium, aluminum, vanadium and copper and maintained at a substantially constant temperature between about 330 and 800° F. for an interval sufficient to substantially improve the wettability of said polyolefin surface with polar liquids and removing said sheet from contact with said oxidized metal surface while the temperatures throughout at least half the thickness of said sheet are below the crystalline melting point of said polyolefin, whereby the adhesion of polar inks and adhesives to said polyolefin surface are substantially improved.

12. A process according to claim 11 in which said polyolefin is polyethylene and said oxidized metal surface is maintained at a temperature between about 400 and 600° F.

13. A process according to claim 11 in which said polyolefin is polypropylene and said oxidized metal surface is maintained at a temperature between about 400 and 600° F.

14. A continuous process for activating the surface of preformed polyolefins which comprises heating a surface of a moving preformed polyolefin web in intimate contact with an oxidized metal surface adherent to a rotating cylinder of a metal of the group consisting of chromium, aluminum, vanadium and copper and maintained at a substantially constant temperature between about 330 and 800° F. for an interval sufficient to substantially improve the wettability of said polyolefin surface with polar liquids and thereafter disengaging said web from said cylindrical surface while the temperatures throughout at least half the thickness of said web are below the crystalline melting point of said polyolefin, whereby the bonding characteristics of said web surface with materials having polar characteristics are substantially improved.

15. A process for conditioning and printing a resin sheet which comprises heating a surface of a preformed sheet of a nonpolar hydrocarbon resin in intimate contact with an oxidized metal surface adherent to a body of a metal of the group consisting of chromium, aluminum, vanadium and copper and maintained at a substantially constant temperature between about 330 and 800° F. for an interval sufficient to substantially improve the wettability of said resin surface with polar liquids, removing said sheet from contact with said oxidized metal surface while the temperatures throughout at least half the thickness of said sheet are below the crystalline melting point of said resin and printing said heat-treated resin surface with an ink of substantial polar characteristics, whereby improved ink adhesion to said resin surface is obtained.

16. A continuous process for conditioning and printing the surface of polyolefin materials which comprises heating a surface of a moving preformed polyolefin web in intimate contact with an oxidized metal surface adherent to a rotating cylinder of a metal of the group consisting of chromium, aluminum, vanadium and copper and maintained at a temperature between about 330 and 800° F. for an interval sufficient to substantially improve the wettability of said polyolefin surface with polar liquids, disengaging said web from said cylindrical surface while the temperatures throughout at least half the thickness of said web are below the crystalline melting point of said polyolefin and printing said heat-treated web surface with an ink having substantially polar characteristics, whereby improved adhesion of ink to said web surface is obtained.

17. A process according to claim 16 in which a single surface of a web of polyethylene film is heat-treated on a cylindrical surface maintained at a substantially constant temperature between about 400 and 600° F.

18. A process according to claim 16 in which a single surface of a web of polypropylene film is heat-treated on a cylindrical surface maintained at a substantially constant temperature between about 400 and 600° F.

References Cited

UNITED STATES PATENTS

| | | | |
|---|---|---|---|
| 2,586,820 | 2/1952 | Hemperly et al. | 264—175 |
| 2,631,954 | 3/1953 | Bright | 117—47 |
| 2,886,471 | 5/1959 | Bruce et al. | |
| 2,970,078 | 1/1961 | Nielsen | 117—47 |
| 3,007,207 | 11/1961 | Salhofer | 264—175 |

MURRAY KATZ, *Primary Examiner.*